United States Patent
Ogura

[11] Patent Number: 5,998,776
[45] Date of Patent: Dec. 7, 1999

[54] TRACK JUMP CONTROLLING UNIT CAPABLE OF CORRECTLY JUMPING LIGHT BEAM SPOT OF PHOTO PICKUP DEVICE FROM ONE OF TRACKS TO OTHER ONE OF TRACKS

[75] Inventor: Masanori Ogura, Tokyo, Japan

[73] Assignee: NEC Corporation, Tokyo, Japan

[21] Appl. No.: 09/035,890

[22] Filed: Mar. 6, 1998

[30] Foreign Application Priority Data

Mar. 7, 1997 [JP] Japan ..................................... 9-070833

[51] Int. Cl.$^6$ ........................................................ G11B 7/00
[52] U.S. Cl. ..................................... 250/201.5; 369/44.28
[58] Field of Search .......................... 250/201.5, 201.1; 369/44.25, 44.28, 44.29, 44.32

[56] References Cited

U.S. PATENT DOCUMENTS 5,684,767  11/1997  Nakano ................................ 369/44.28

FOREIGN PATENT DOCUMENTS 0 296 338  12/1988  European Pat. Off. .
62-139131   6/1987  Japan .
4-60925     2/1992  Japan .

OTHER PUBLICATIONS

Patent Abstract of Japan, vol., 011, No. 366, Nov. 28, 1987 (corresponds to JPA 62–139131).

Primary Examiner—Edward P. Westin
Assistant Examiner—Kevin Pyo
Attorney, Agent, or Firm—Sughrue, Mion, Zinn, Macpeak & Seas, PLLC

[57] ABSTRACT

In a track jump controlling unit, a tracking error detecting circuit detects a tracking error signal in response to a light beam detecting signal from a photo detecting circuit. A zero cross detecting circuit detects a zero cross of the tracking error signal to produce a zero cross detecting signal. A level comparing circuit compares a level of the tracking error signal with a predetermined reference level to produce a comparison signal when the level of the tracking error signal is higher than the predetermined reference level. A timer times first and second predetermined time periods from occurrence of a jump command signal to produce first and second time out signals. The second predetermined time period is greater than the first predetermined time period. A jump pulse producing circuit produces a kick pulse of a jump pulse signal in response to the jump command signal and holds the kick pulse regardless of the zero cross detecting signal until the jump pulse producing circuit is supplied with the first time out signal when the jump pulse producing circuit is not supplied with the comparison signal. The jump pulse producing circuit produces a brake pulse of the jump pulse signal when the jump pulse producing circuit is supplied with at least one of the zero cross detecting signal and the second time out signal after the kick pulse turns to the zero point. At least one of the timer and the level comparing circuit may be omitted.

3 Claims, 10 Drawing Sheets

TRACK JUMP CONTROLLING UNIT
CAPABLE OF CORRECTLY JUMPING
LIGHT BEAM SPOT OF PHOTO PICKUP
DEVICE FROM ONE OF TRACKS TO
OTHER ONE OF TRACKS

BACKGROUND OF THE INVENTION

This invention relates to a track jump controlling unit which uses in a photo disk system.

DESCRIPTION OF THE RELATED ART

In the manner which will later be described more in detail, a conventional track jump controlling unit comprises a photo detecting circuit, a tracking error detecting circuit, a phase compensating circuit, a zero cross detecting circuit, a jump command producing circuit, a jump pulse producing circuit, a controlling circuit, a switching circuit, and a tracking actuator.

The photo detecting circuit detects a reflected light beam from a photo disk which is supplied with a light beam from the photo pickup device to produce a light beam detecting signal. The tracking error detecting circuit detects a tracking error signal when the tracking error detecting circuit is supplied with the light beam detecting signal from the photo detecting circuit. The phase compensating circuit produces a phase compensating signal when the phase compensating circuit 3 is supplied with the tracking error signal from the tracking error detecting circuit.

The zero cross detecting circuit detects a zero cross of the tracking error signal from the tracking error detecting circuit to produce a zero cross detecting signal. The controlling circuit produces a jump sequence start signal to supply the jump sequence start signal to the jump command producing circuit. The jump command producing circuit produces a jump command signal when the jump command producing circuit is supplied with the jump sequence start signal from the controlling circuit. The jump command producing circuit supplies the jump command signal to the jump pulse producing circuit. The jump pulse producing circuit produces a jump pulse signal which has a kick pulse and a brake pulse when the jump pulse producing circuit is supplied with the jump command signal from the jump command producing circuit.

Also, the controlling circuit produces a switch control signal to supply the switch control signal to the switching circuit. The switching circuit connects the phase compensating circuit to the tracking actuator when the switching circuit is not supplied with the switch control signal from the controlling circuit. The switching circuit connects the jump pulse producing circuit to the tracking actuator when the switching circuit is supplied with the switch control signal from the controlling circuit. The tracking actuator executes an operation of tracking when the tracking actuator is supplied with the phase compensating signal from the phase compensating circuit. Also, the tracking actuator jumps an object lens, namely, a light beam spot, of a photo pickup device from one of tracks of a photo disk to other one of the tracks that is adjacent to the one of the tracks when the tracking actuator is supplied with the jump pulse signal from the jump pulse producing circuit. In this event, the tracking actuator jumps, in a perpendicular to the tracks, the object lens of the photo pickup device.

In addition, the jump pulse producing circuit produces the kick pulse when the jump pulse producing circuit is supplied with the jump command signal from the jump command producing circuit. Thereafter, the jump pulse producing circuit produces the brake pulse when the jump pulse producing circuit is supplied with the zero cross detecting signal from the zero cross detecting circuit.

The jump pulse producing circuit produces the kick pulse when the jump pulse producing circuit is supplied with the jump command signal from the jump command producing circuit. Thereby, a level of the tracking error signal is increased until the level of the tracking error signal reaches at a predetermined level. Thereafter, the level of the tracking error signal is decreased to pass the zero point. When the level of the tracking error signal passes the zero point, the zero cross detecting circuit produces the zero cross detecting signal to supply the zero cross detecting signal to the jump pulse producing circuit. The jump pulse producing circuit produces the brake pulse which the jump pulse producing circuit is supplied with the zero cross detecting signal from the zero cross detecting circuit. Thus, the tracking actuator jumps the object lens of the photo pickup device from the one of the tracks of the photo disk to the other one of the tracks that is adjacent to the one of the tracks when the tracking actuator is supplied with the jump pulse signal from the jump pulse producing circuit.

Another conventional track jump controlling unit of the type described is disclosed in Japanese Unexamined Patent Prepublication (koukai) No. 139131/1987. The other conventional track jump controlling unit further comprises a jump pulse producing circuit which stops, at a lapse time point of a predetermined time period, to hold the kick pulse even when the jump pulse producing circuit is not supplied with the zero cross detecting signal from the zero cross detecting circuit to produce the brake pulse.

However, the conventional track jump controlling units are incapable of correctly jumping the light beam spot of the photo pickup device from the one of the tracks of the photo disk to the other one of the tracks that is adjacent to the one of the tracks when the photo disk has a flaw or a waste to be adhered to the photo disk. This is because occurrence of the zero cross detecting signal is hastened or late when the tracking error signal is confused by the flaw of the photo disk or the waste on the photo disk. Thereby, occurrence of the brake pulse is hastened or late.

SUMMARY OF THE INVENTION

It is therefore an object of this invention to provide a track jump controlling units which is capable of correctly jumping a light beam spot of a photo pickup device from one of tracks of a photo disk to other one of the tracks that is adjacent to the one of the tracks even when the photo disk has a flaw or a waste to be adhered to the photo disk.

Other objects of this invention will become clear as the description proceeds.

According to a first aspect of this invention, there is provided a track jump controlling unit comprising:

track jumping means for jumping a light beam spot of a photo pickup device from one of tracks of a photo disk to other one of the tracks that is adjacent to the one of the tracks when the track jumping means is supplied with a jump pulse signal which has a kick pulse and a brake pulse following the kick pulse;

reflected light beam detecting means for detecting a reflected light beam from the photo disk which is supplied with a light beam from the photo pickup device to produce a light beam detecting signal;

tracking error detecting means connected to the reflected light beam detecting means for detecting a tracking error signal when the tracking error detecting means is supplied with the light beam detecting signal;

zero cross detecting means conn ected to the tracking error detecting means for detecting a zero cross of the tracking error signal from the tracking error detecting means to produce a zero cross detecting signal;

level comparing means connected to the tracking error signal detecting means for comparing a level of the tracking error signal with a predetermined reference level to produce a comparison signal when the level of the tracking error signal is higher than the predetermined reference level;

controlling means for producing a jump command signal; and jump pulse producing means connected to the track jumping means, to the zero cross detecting means, to the level comparing means, and to the controlling means for producing the kick pulse when the jump pulse producing means is supplied with the jump command signal, for holding, in a predetermined time period, the kick pulse regardless of the zero cross detecting signal when the jump pulse producing means is not supplied with the comparison signal, and for producing the brake pulse when the jump pulse producing means is supplied with the zero cross detecting signal after the kick pulse turns to the zero point.

According to a second aspect of this invention, there is provided a track jump controlling unit comprising:

track jumping means for jumping a light beam spot of a photo pickup device from one of tracks of a photo disk to other one of the tracks that is adjacent to the one of the tracks when the track jumping means is supplied with a jump pulse signal which has a kick pulse and a brake pulse following the kick pulse;

reflected light beam detecting means for detecting a reflected light beam from the photo disk which is supplied with a light beam from the photo pickup device to produce a light beam detecting signal;

tracking error detecting means connected to the reflected light beam detecting means for detecting a tracking error signal when the tracking error detecting means is supplied with the light beam detecting signal;

zero cross detecting means conn ected to the tracking error detecting means for detecting a zero cross of the tracking error signal from the tracking error detecting means to produce a zero cross detecting signal;

controlling means for producing a jump command signal;

timing means connected to the controlling means for timing a first predetermined time period from occurrence of the jump command signal to produce a first time out signal, and for timing a second predetermined time period from occurrence of the jump command signal to produce a second time out signal, the second predetermined time period being greater than the first predetermined time period; and jump pulse producing means conn ected to the track jumping means, to the zero cross detecting means, to the controlling means, and to the timing means for producing the kick pulse when the jump pulse producing means is supplied with the jump command signal, for holding the kick pulse regardless of the zero cross detecting signal until the jump pulse producing means is supplied with the first time out signal, and for producing the brake pulse when the jump pulse producing means is supplied with at least one of the zero cross detecting signal and the second time out signal after the kick pulse turns to the zero point.

According to a third aspect of this invention, there is provided a track jump controlling unit comprising:

track jumping means for jumping a light beam spot of a photo pickup device from one of tracks of a photo disk to other one of the tracks that is adjacent to the one of the tracks when the track jumping means is supplied with a jump pulse signal which has a kick pulse and a brake pulse following the kick pulse;

reflected light beam detecting means for detecting a reflected light beam from the photo disk which is supplied with a light beam from the photo pickup device to produce a light beam detecting signal;

tracking error signal detecting means connected to the reflected light beam detecting means for detecting a tracking error signal when the tracking error signal detecting means is supplied with the light beam detecting signal;

zero cross detecting means connected to the tracking error signal detecting means for detecting zero cross of the tracking error signal from the tracking error signal detecting means to produce a zero cross detecting signal;

level comparing means connected to the tracking error signal detecting means for comparing a level of the tracking error signal with a predetermined reference level to produce a comparison signal when the level of the tracking error signal is higher than the predetermined reference level;

controlling means for producing a jump command signal;

timing means connected to the controlling means for timing a first predetermined time period from occurrence of the jump command signal to produce a first time out signal, and for timing a second predetermined time period from occurrence of the jump command signal to produce a second time out signal, the second predetermined time period being greater than the first predetermined time period; and jump pulse producing means connected to the track jumping means, to the zero cross detecting means, to the level comparing means, to the controlling means, and to the timing means for producing the kick pulse when the jump pulse producing means is supplied with the jump command signal, for holding the kick pulse regardless of the zero cross detecting signal until the jump pulse producing means is supplied with the first time out signal when the jump pulse producing means is not supplied with the comparison signal, and for producing the brake pulse when the jump pulse producing means is supplied with at least one of the zero cross detecting signal and the second time out signal after the kick pulse turns to the zero point.

DESCRIPTION OF THE PREFERRED EMBODIMENTS

Figure 1:
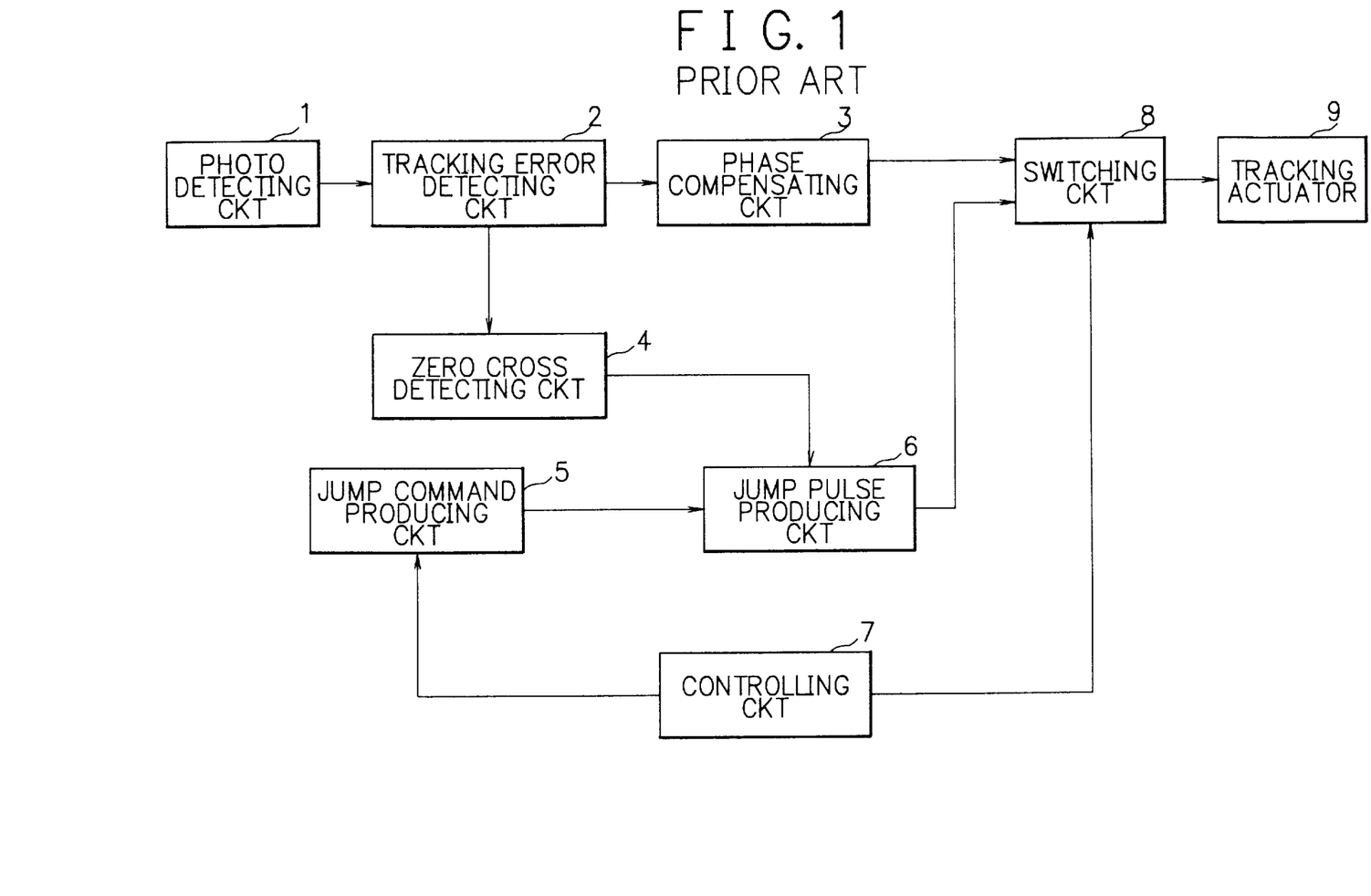
FIG. 1 is a block diagram of a conventional track jump controlling unit.
Figure 2:
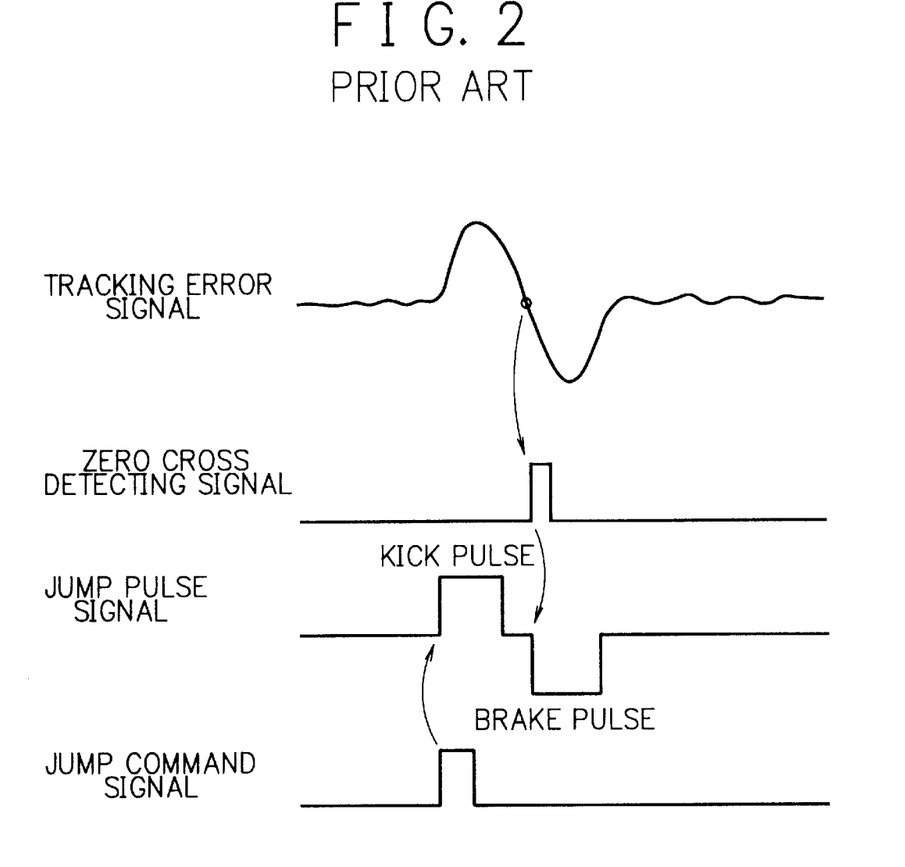
FIG. 2 is a view for describing an operation of the conventional track jump controlling unit illustrated in FIG. 1.

Referring to FIGS. 1 and 2, a conventional track jump controlling unit will first be described for a better understanding of this invention.

In FIG. 1, the conventional track jump controlling unit comprises a photo detecting circuit 1, a tracking error detecting circuit 2, a phase compensating circuit 3, a zero cross detecting circuit 4, a jump command producing circuit 5, a jump pulse producing circuit 6, a controlling circuit 7, a switching circuit 8, and a tracking actuator 9.

The tracking error detecting circuit 2 is connected to the photo detecting circuit 1. The phase compensating circuit 3 is connected to the tracking error detecting circuit 2. The zero cross detecting circuit 4 is connected to the tracking error detecting circuit 2. The jump command producing circuit 5 is connected to the jump pulse producing circuit 6 and to the controlling circuit 7. The jump pulse producing circuit 6 is connected to the zero cross detecting circuit 4. The switching circuit 8 is connected to the phase compensating circuit 3, to the jump pulse producing circuit 6, and to the controlling circuit 7. The tracking actuator 9 is connected to the phase compensating circuit 3 or the jump pulse producing circuit 6 through the switching circuit 8.

The photo detecting circuit 1 detects a reflected light beam from a photo disk which is supplied with a light beam from the photo pickup device to produce a light beam detecting signal. The tracking error detecting circuit 2 detects a tracking error signal when the tracking error detecting circuit 2 is supplied with the light beam detecting signal from the photo detecting circuit 1. The phase compensating circuit 3 produces a phase compensating signal when the phase compensating circuit 3 is supplied with the tracking error signal from the tracking error detecting circuit 2.

The zero cross detecting circuit 4 detects a zero cross of the tracking error signal from the tracking error detecting circuit 2 to produce a zero cross detecting signal. The controlling circuit 7 produces a jump sequence start signal to supply the jump sequence start signal to the jump command producing circuit 5. The jump command producing circuit 5 produces a jump command signal when the jump command producing circuit 5 is supplied with the jump sequence start signal from the controlling circuit 7. The jump command producing circuit 5 supplies the jump command signal to the jump pulse producing circuit 6. The jump pulse producing circuit 6 produces a jump pulse signal which has a kick pulse and a brake pulse following the kick pulse when the jump pulse producing circuit 6 is supplied with the jump command signal from the jump command producing circuit 5.

Also, the controlling circuit 7 produces a switch control signal to supply the switch control signal to the switching circuit 8. The switching circuit 8 connects the phase compensating circuit 3 to the tracking actuator 9 when the switching circuit 8 is not supplied with the switch control signal from the controlling circuit 7. The switching circuit 8 connects the jump pulse producing circuit 6 to the tracking actuator 9 when the switching circuit 8 is supplied with the switch control signal from the controlling circuit 7. The tracking actuator 9 executes an operation of tracking when the tracking actuator 9 is supplied with the phase compensating signal from the phase compensating circuit 3. Also, the tracking actuator 9 jumps an object lens, namely, a light beam spot, of a photo pickup device from one of tracks of a photo disk to other one of the tracks that is adjacent to the one of the tracks when the tracking actuator 9 is supplied with the jump pulse signal from the jump pulse producing circuit 6. In this event, the tracking actuator 9 jumps, in a perpendicular to the tracks, the object lens of the photo pickup device.

In addition, the jump pulse producing circuit 6 produces the kick pulse when the jump pulse producing circuit 6 is supplied with the jump command signal from the jump command producing circuit 5. Thereafter, the jump pulse producing circuit 6 produces the brake pulse which the jump pulse producing circuit 6 is supplied with the zero cross detecting signal from the zero cross detecting cicuit 4.

Referring to FIG. 2, the jump pulse producing circuit 6 produces the kick pulse when the jump pulse producing circuit 6 is supplied with the jump command signal from the jump command producing circuit 5. Thereby, a level of the tracking error signal is increased until the level of the tracking error signal reaches at a predetermined level. Thereafter, the level of the tracking error signal is decreased to pass the zero point. When the level of the tracking error signal passes the zero point, the zero cross detecting circuit 4 produces the zero cross detecting signal to supply the zero cross detecting signal to the jump pulse producing circuit 6. The jump pulse producing circuit 6 produces the brake pulse which the jump pulse producing circuit 6 is supplied with the zero cross detecting signal from the zero cross detecting circuit 4. Thus, the tracking actuator 9 jumps the object lens of the photo pickup device from the one of the tracks of the photo disk to the other one of the tracks that is adjacent to the one of the tracks when the tracking actuator 9 is supplied with the jump pulse signal from the jump pulse producing circuit 6.

Figure 3:
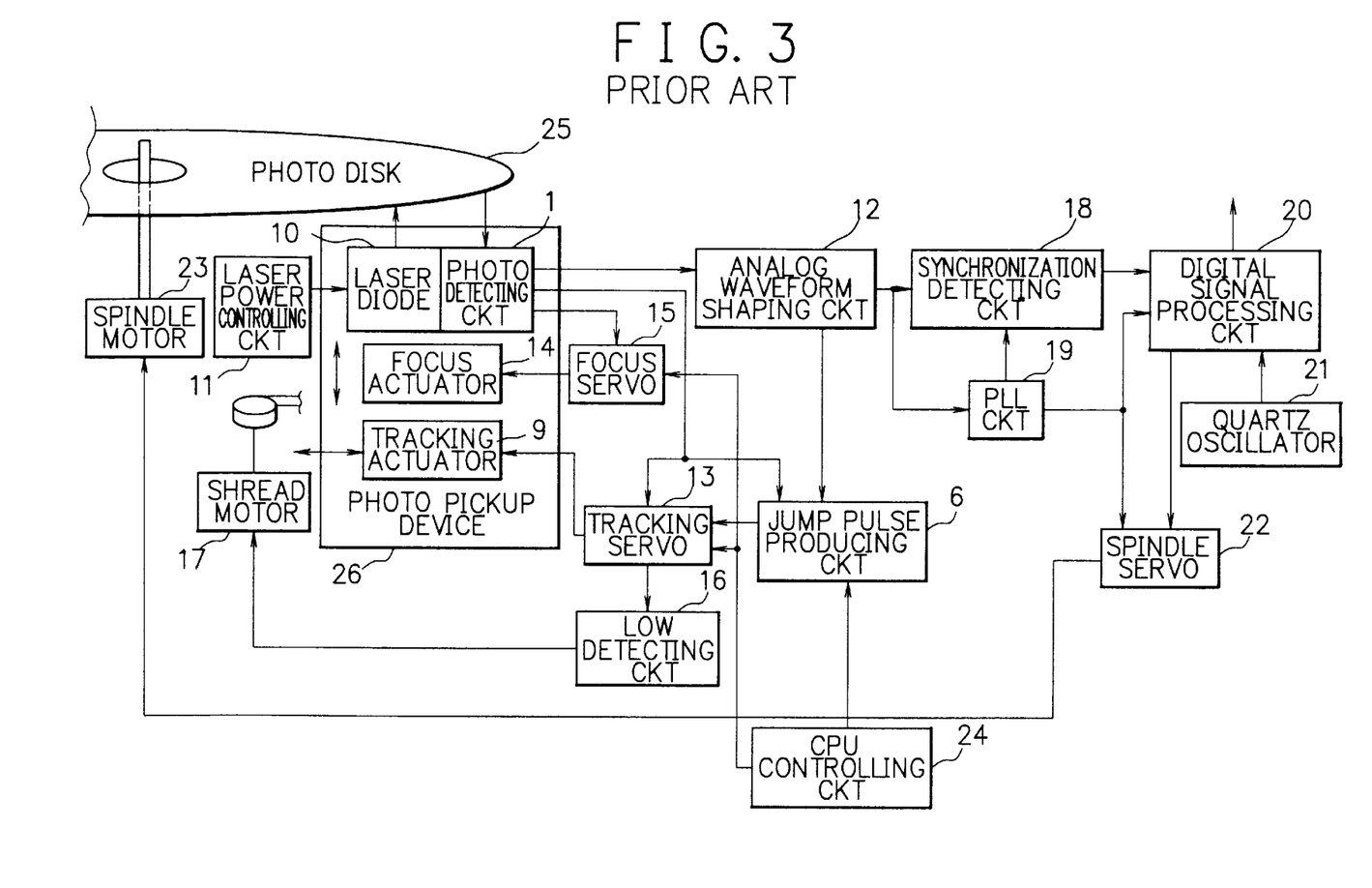
FIG. 3 is a block diagram of a conventional photo disk system which comprises the conventional track jump controlling unit illustrated in FIG. 1.

Referring to FIG. 3, the description will proceed to a conventional photo disk system which comprises the photo disk, the photo pickup device, and the track jump controlling unit.

The photo disk system comprises the photo detecting circuit 1, the jump pulse producing circuit 6, the tracking actuator 9, a laser diode 10, a laser power controlling circuit 11, an analog waveform shaping circuit 12, a tracking servo 13, a focus actuator 14, a focus servo 15, a low detecting circuit 16, a shread motor 17, a synchronization detecting circuit 18, a PLL (phase locked loop) circuit 19, a digital signal processing circuit 20, a quartz oscillator 21, a spindle servo 22, a spindle motor 23, a CPU controlling circuit 24, and the photo disk 25. The photo pickup device 26 comprises the photo detecting circuit 1, the tracking actuator 9, the laser diode 10, and the focus actuator 14.

Another conventional track jump controlling unit of the type described is disclosed in Japanese Unexamined Patent Prepublication (koukai) No. 139131/1987. The other conventional track jump controlling unit further comprises a jump pulse producing circuit which stops, at a lapse time point of a predetermined time period, to hold the kick pulse even when the jump pulse producing circuit is not supplied with the zero cross detecting signal from the zero cross detecting circuit to produce the brake pulse.

However, the conventional track jump controlling units are incapable of correctly jumping the light beam spot of the photo pickup device from the one of the tracks of the photo disk to the other one of the tracks that is adjacent to the one of the tracks when the photo disk has a flaw or a waste to be adhered to the photo disk. This is because occurrence of the zero cross detecting signal is hastened or late when the tracking error signal is confused by the flaw of the photo disk or the waste on the photo disk. Thereby, occurrence of the brake pulse is hastened or late. Referring to FIGS. 4, 5, 6, and 7, the description will proceed to a track jump controlling unit according to a first embodiment of this invention. Similar parts are designated by like reference numerals.

Figure 4:
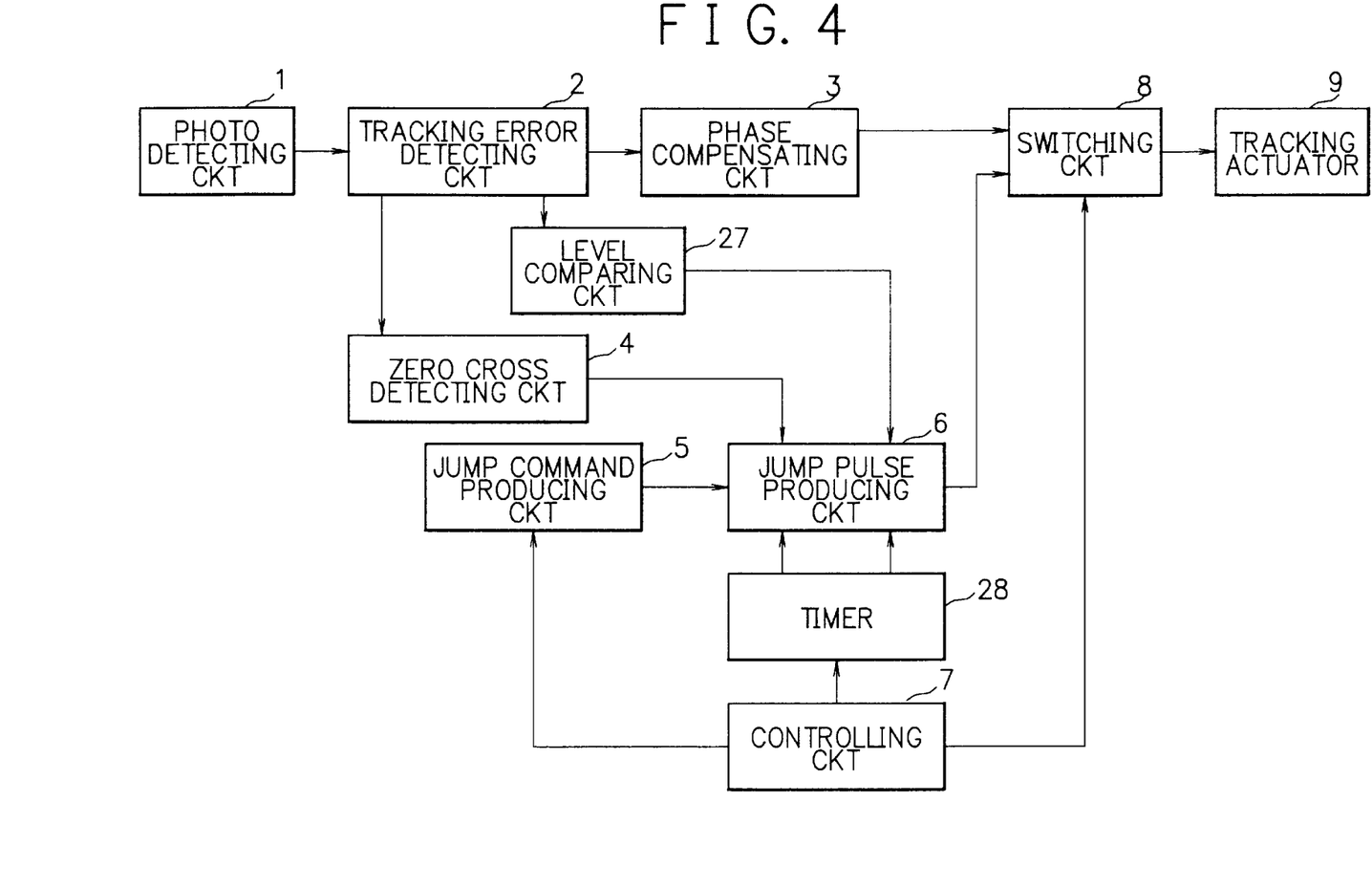
FIG. 4 is a block diagram of a track jump controlling unit according to a first embodiment of this invention.

In FIG. 4, the track jump controlling unit comprises the photo detecting circuit 1, the tracking error detecting circuit 2, the phase compensating circuit 3, the zero cross detecting circuit 4, the jump command producing circuit 5, the jump pulse producing circuit 6, the controlling circuit 7, the switching circuit 8, the tracking actuator 9, a level comparing circuit 27, and a timer 28.

The tracking error detecting circuit 2 is connected to the photo detecting circuit 1. The phase compensating circuit 3 is connected to the tracking error detecting circuit 2. The zero cross detecting circuit 4 is connected to the tracking error detecting circuit 2. The jump command producing circuit 5 is connected to the jump pulse producing circuit 6 and to the controlling circuit 7. The jump pulse producing circuit 6 is connected to the zero cross detecting circuit 4. The switching circuit 8 is connected to the phase compensating circuit 3, to the jump pulse producing circuit 6, and to the controlling circuit 7. The tracking actuator 9 is connected to the phase compensating circuit 3 or the jump pulse producing circuit 6 through the switching circuit 8. The level comparing circuit 27 is connected to the tracking error detecting circuit 2 and to the jump pulse producing circuit 6. The timer 28 is connected to the controlling circuit 7 and to the jump pulse producing circuit 6.

The photo detecting circuit 1 detects the reflected light beam from the photo disk which is supplied with the light beam from the photo pickup device to produce the light beam detecting signal. The tracking error detecting circuit 2 detects the tracking error signal when the tracking error detecting circuit 2 is supplied with the light beam detecting signal from the photo detecting circuit 1. The phase compensating circuit 3 produces the phase compensating signal when the phase compensating circuit 3 is supplied with the tracking error signal from the tracking error detecting circuit 2.

The zero cross detecting circuit 4 detects the zero cross of the tracking error signal from the tracking error detecting circuit 2 to produce the zero cross detecting signal. The controlling circuit 7 produces the jump sequence start signal to supply the jump sequence start signal to the jump command producing circuit 5. The jump command producing circuit 5 produces the jump command signal when the jump command producing circuit 5 is supplied with the jump sequence start signal from the controlling circuit 7. The jump command producing circuit 5 supplies the jump command signal to the jump pulse producing circuit 6. The jump pulse producing circuit 6 produces the jump pulse signal which has the kick pulse and the brake pulse when the jump pulse producing circuit 6 is supplied with the jump command signal from the jump command producing circuit 5.

Also, the controlling circuit 7 produces the switch control signal to supply the switch control signal to the switching circuit 8. The switching circuit 8 connects the phase compensating circuit 3 to the tracking actuator 9 when the switching circuit 8 is not supplied with the switch control signal from the controlling circuit 7. The switching circuit 8 connects the jump pulse producing circuit 6 to the tracking actuator 9 when the switching circuit 8 is supplied with the switch control signal from the controlling circuit 7. The tracking actuator 9 executes the operation of tracking when the tracking actuator 9 is supplied with the phase compensating signal from the phase compensating circuit 3. Also, the tracking actuator 9 jumps the object lens, namely the light beam spot, of the photo pickup device from the one of the tracks of the photo disk to the other one of the tracks that is adjacent to the one of the tracks when the tracking actuator 9 is supplied with the jump pulse signal from the jump pulse producing circuit 6. In this event, the tracking actuator 9 jumps, in the perpendicular to the tracks, the object lens of the photo pickup device.

The level comparing circuit 27 compares a level of the tracking error signal from the tracking error detecting circuit 2 with a predetermined reference level to produce a comparison signal when the level of the tracking error signal is higher than the predetermined reference level. The controlling circuit 7 produces the jump sequence start signal to supply the jump sequence start signal to the timer 28. The timer 28 times a first predetermined time period from occurrence of the jump sequence start signal, namely, occurrence of the jump command signal to produce a first time out signal. Also, the timer 28 times a second predetermined time period from occurrence of the jump sequence start signal, name ly, occurrence of the jump command signal to produce a second time out signal. The second predetermined time period is greater than the first predetermined time period.

The jump pulse producing circuit 6 produces the kick pulse when the jump pulse producing circuit 6 is supplied with the jump command signal from the jump command producing circuit 5. The jump pulse producing circuit 6 holds the kick pulse regardless of the zero cross detecting signal until the jump pulse producing circuit 6 is supplied with the first time out signal when the jump pulse producing circuit 6 is not supplied with the comparison signal. The jump pulse producing circuit 6 produces the brake pulse when the jump pulse producing circuit 6 is supplied with at least one of the zero cross detecting signal and the second time out signal after the kick pulse turns to the zero point. The jump pulse producing circuit 6 supplies the kick pulse and the brake pulse to the tracking actuator 9 through the switching circuit 8.

Figure 5:
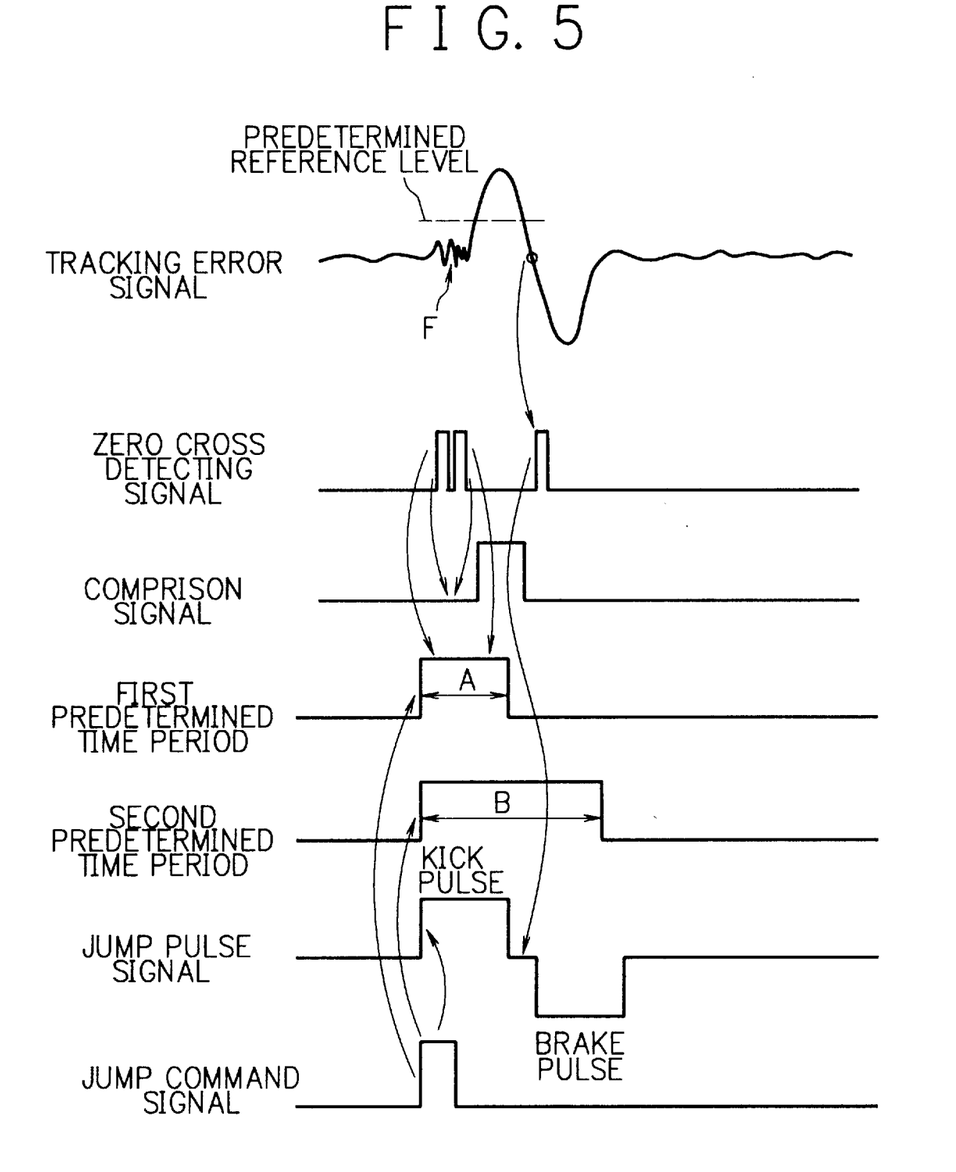
FIG. 5 is a view for describing an operation of occurrence of a kick pulse and a brake pulse in the track jump controlling unit illustrated in FIG. 4.

Referring to FIG. 5, the description will proceed to an operation of occurrence of the kick pulse and the brake pulse in the track jump controlling unit. When the jump command signal occurs, the jump pulse producing circuit 6 produces the kick pulse of the jump pulse signal. At the same time, the timer 28 is started. In case that a pit and a flute of the photo disk have flaws, the tracking error signal frequently passes the zero point as shown by an arrow F. As a result, the zero cross detecting signals earlier and frequently occur. However, the zero cross detecting signals occur in the first predetermined time period A, namely, before the first time out signal occurs. Also, the comparison signal is not produced. Therefore, the kick pulse is held in the first predetermined time period A, namely, until the first time out signal occurs. The jump pulse producing circuit 6 produces the brake pulse when the jump pulse producing circuit 6 is supplied with the zero cross detecting signal after the kick pulse turns to the zero point. Thus, the kick pulse and the brake pulse are correctly produced.

Figure 6:
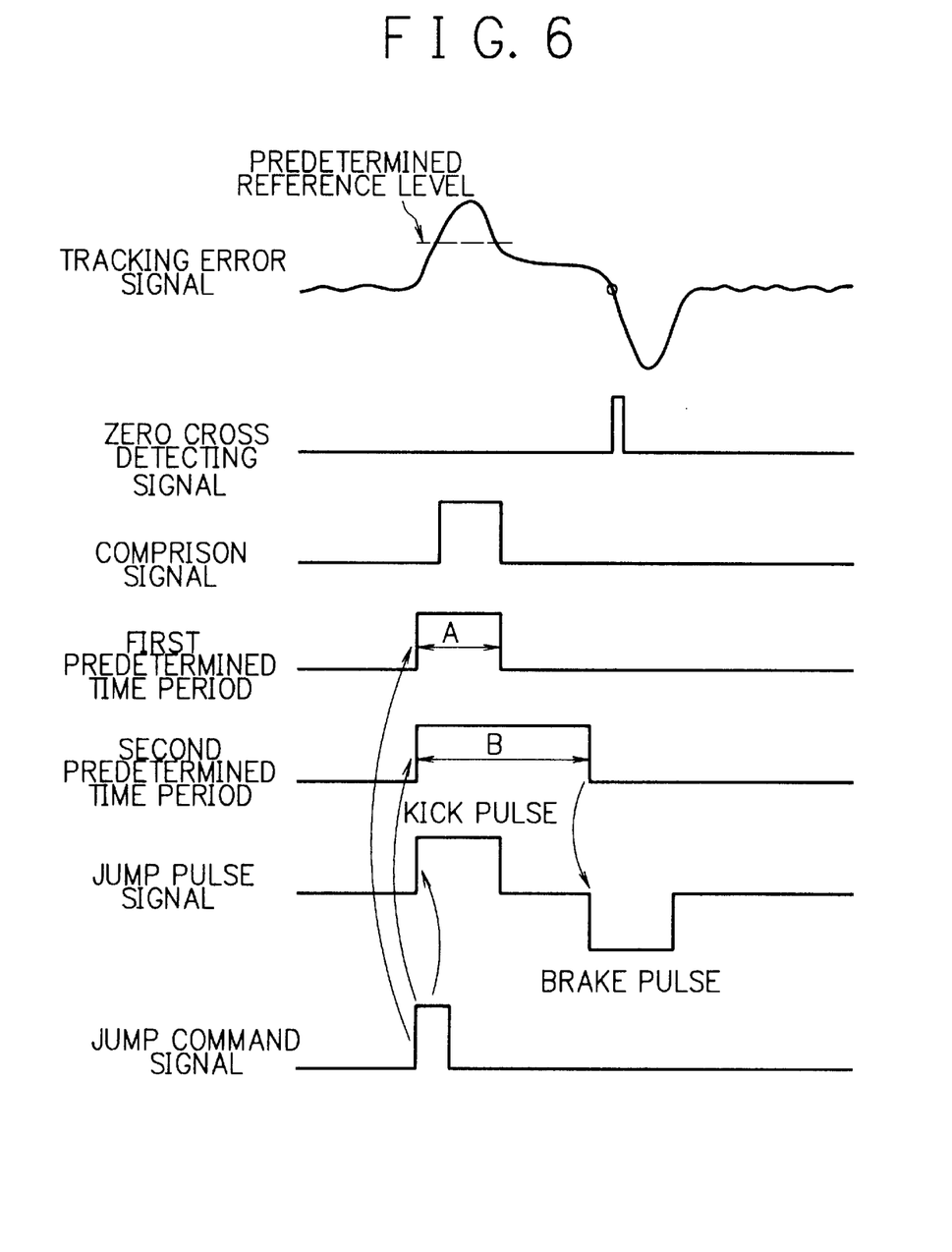
FIG. 6 is a view for describing another operation of occurrence of the kick pulse and the brake pulse in the track jump controlling unit illustrated in FIG. 4.

Referring to FIG. 6, the description will proceed to another operation of occurrence of the kick pulse and the brake pulse in the track jump controlling unit. When the jump command signal occurs, the jump pulse producing circuit 6 produces the kick pulse of the jump pulse signal. At the same time, the timer 28 is started. In case that a pit and a flute of the photo disk have wastes to be adhered to the pit and the flute, the tracking error signal lately passes the zero point. As a result, occurrence of the zero cross detecting signal is late. The jump pulse producing circuit 6 produces the brake pulse when the jump pulse producing circuit 6 is supplied with the second time out signal, namely, when the second predetermined time period B elapses, after the kick pulse turns to the zero point. Thus, the kick pulse and the brake pulse are correctly produced.

Figure 7:
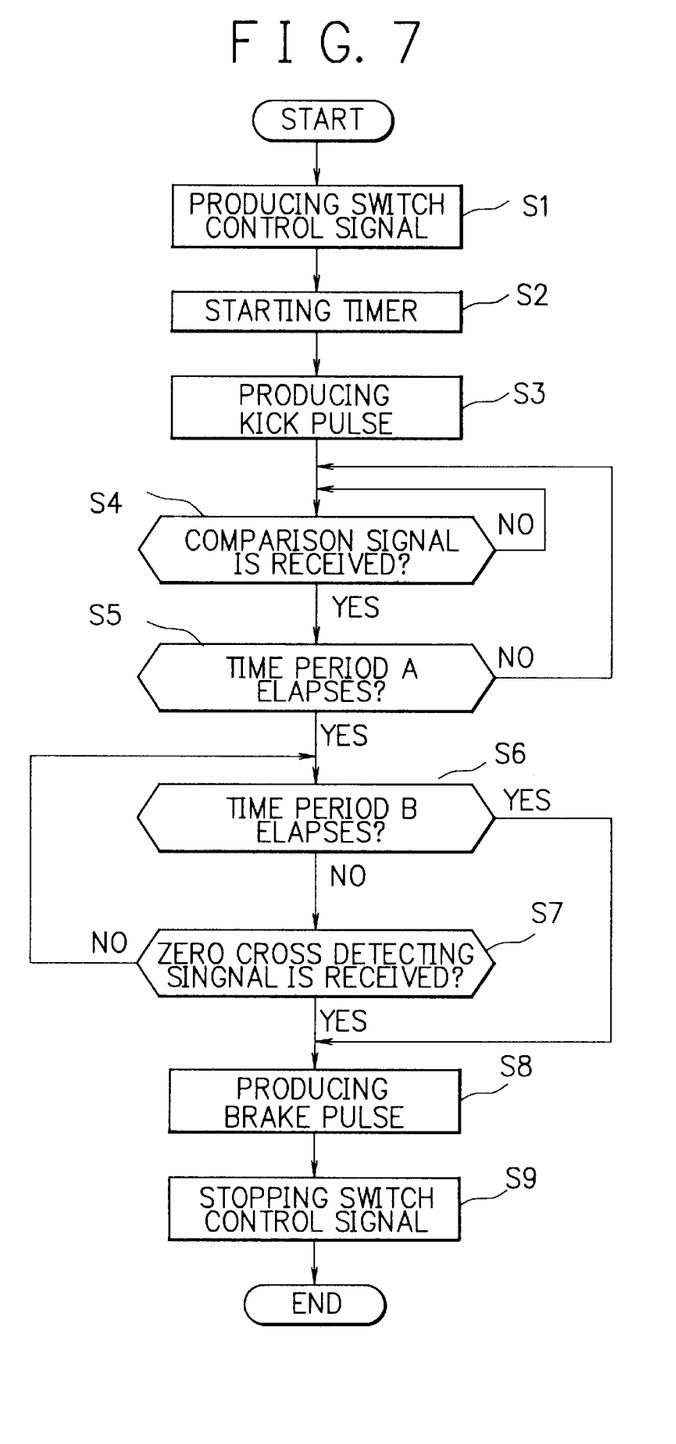
FIG. 7 is a flow chart for describing an operation of the track jump controlling unit illustrated in FIG. 4.

Referring to FIG. 7, the description will proceed to an operation of the track jump controlling unit. At a step S1, the switching circuit 8 disconnects the phase compensating circuit 3 from the tracking actuator 9 and connects the jump pulse producing circuit 6 to the tracking actuator 9 when the switching circuit 8 is supplied with the switch control signal from the controlling circuit 7. The step S1 proceeds to a step S2 at which the controlling circuit 7 starts the timer 28. The step S2 proceeds to a step S3 at which the jump pulse producing circuit 6 produces the kick pulse.

The step S3 proceeds to a step S4 at which the jump pulse producing circuit 6 judges whether or not the comparison signal is received. When the comparison signal is received, the step S4 proceeds to a step S5. Otherwise, the step S4 is repeated. At the step S5, the jump pulse producing circuit 6 judges whether or not the first predetermined time period A elapses, namely, whether or not the jump pulse producing circuit 6 is supplied with the first time out signal. When the first predetermined time period A does not elapse, the step S5 returns to the step S4. When the first predetermined time period A elapses, the step S5 proceeds to a step S6. At the step S6, the jump pulse producing circuit 6 judges whether or not the second predetermined time period B elapses, namely, whether or not the jump pulse producing circuit 6 is supplied with the second time out signal.

When the second predetermined time period B does not elapse, the step S6 proceeds to a step S7. At the step S7, the jump pulse producing circuit 6 judges whether or not the zero cross detecting signal is received. When the zero cross detecting signal is not received, the step S7 returns to the step S6. Otherwise, the step S7 proceeds to a step S8. Also, when the second predetermined time period B elapses in the step S6, the step S6 jumps to the step S8. At the step S8, the jump pulse producing circuit 6 produces the brake pulse. The step S8 proceeds to a step S9 at which the controlling circuit 7 stops the switch control signal. In this event, the switching circuit 8 disconnects the jump pulse producing circuit 6 from the tracking actuator 9 and connects the phase compensating circuit 3 to the tracking actuator 9 when the switching circuit 8 is not supplied with the switch control signal from the controlling circuit 7.

Figure 8:
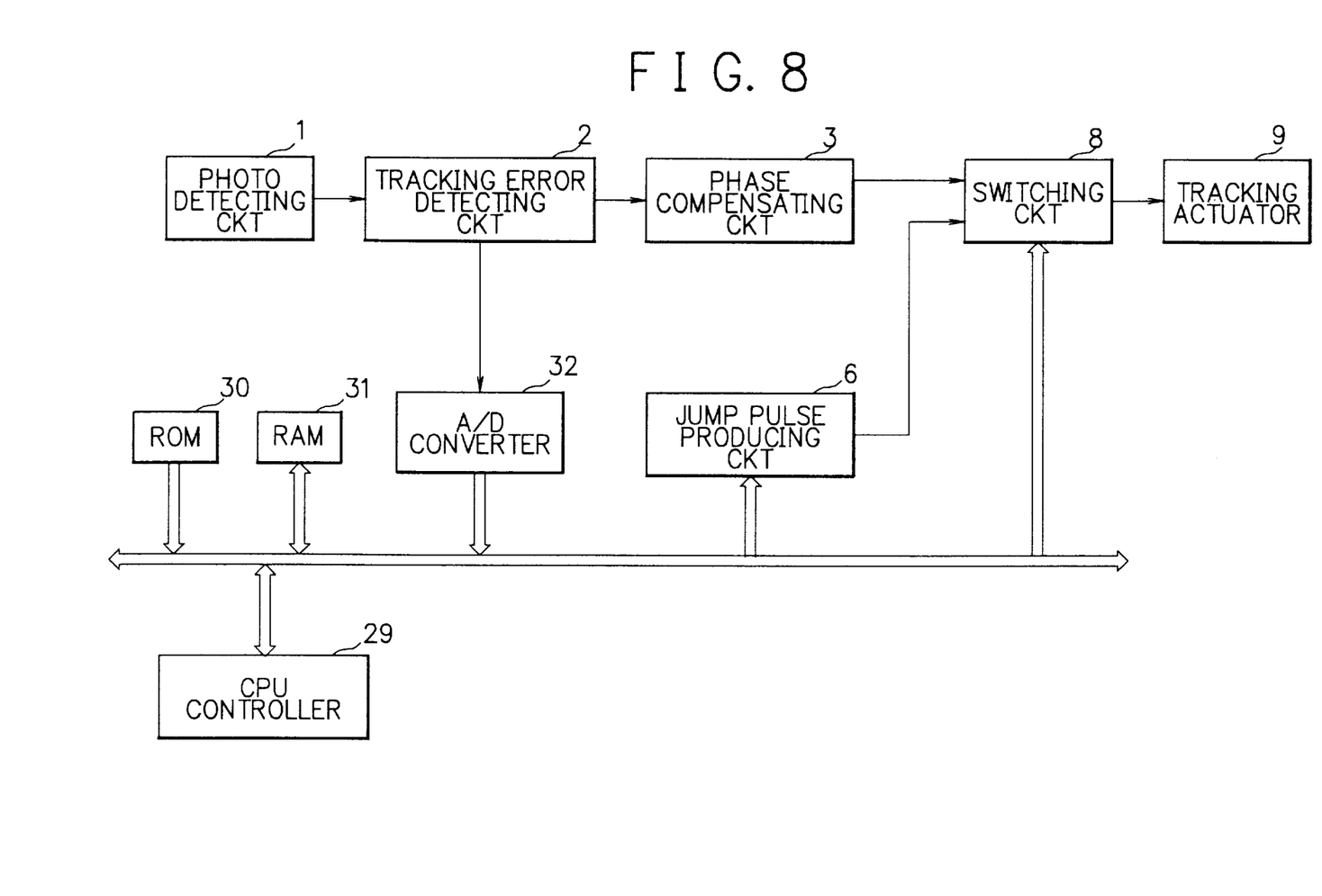
FIG. 8 is a block diagram of a track jump controlling unit according to a second embodiment of this invention.

Referring to FIG. 8, the description will proceed to a track jump controlling unit according to a second embodiment of this invention. Similar parts are designated by like reference numerals. The track jump controlling unit comprises the photo detecting circuit 1, the tracking error detecting circuit 2, the phase compensating circuit 3, the jump pulse producing circuit 6, the switching circuit 8, the tracking actuator 9, a CPU controller 29, a ROM 30, a RAM 31, and an A/D converter 32.

The tracking error detecting circuit 2 is connected to the photo detecting circuit 1. The phase compensating circuit 3 is connected to the tracking error detecting circuit 2. The jump pulse producing circuit 6 is connected to the switching circuit 8 and to the CPU controller 29. The switching circuit 8 is connected to the phase compensating circuit 3, to the jump pulse producing circuit 6, and to the CPU controller 29. The tracking actuator 9 is connected to the phase compensating circuit 3 or the jump pulse producing circuit 6 through the switching circuit 8. The ROM 30 and the RAM 31 are connected to the CPU controller 29. The A/D converter 32 is connected to the tracking error detecting circuit 2 and to the CPU controller 29.

The photo detecting circuit 1 detects a reflected light beam from the photo disk which is supplied with the light beam from the photo pickup device to produce the light beam detecting signal. The tracking error detecting circuit 2 detects the tracking error signal when the tracking error detecting circuit 2 is supplied with the light beam detecting signal from the photo detecting circuit 1. The phase compensating circuit 3 produces the phase compensating signal when the phase compensating circuit 3 is supplied with the tracking error signal from the tracking error detecting circuit 2.

The A/D converter 32 converts the tracking error signal from the tracking error detecting circuit 2 to produce a digital tracking error signal. The A/D converter 32 supplies the digital tracking error signal to the CPU controller 29. The ROM 30 stores a program. The RAM 31 holds the predetermined reference level. Also, the RAM 31 holds a first time out value which corresponds to the first time period and a second time out value which corresponds to the second time period. The CPU controller 29 sets the predetermined reference level and the first and second time out values in the RAM 31 in response to the program from the ROM 30.

The CPU controller 29 produces the jump command signal when the CPU is supplied with the jump sequence start signal of the program from the ROM 30. At the same time, the CPU controller 29 produces the switch control signal to supply the switch control signal to the switching circuit 8. Also, the CPU controller 29 supplies the jump command signal to the jump pulse producing circuit 6. The jump pulse producing circuit 6 produces the jump pulse signal which has the kick pulse and the brake pulse when the jump pulse producing circuit 6 is supplied with the jump command signal from the CPU controller 29. The CPU controller 29 detects a zero cross of the digital tracking error signal from the A/D converter 32 to produce the zero cross detecting signal. The CPU controller 29 supplies the zero cross detecting signal to the jump pulse producing circuit 6.

The CPU controller 29 starts to time a time period from occurrence of the jump sequence start signal, namely, occurrence of the jump command signal to produce a timed period value. The CPU controller 29 compares the timed period value with the first time out value from the RAM 31 to produce the first time out signal when the timed period value coincides with the first time out value. The CPU controller 29 compares the timed period value with the second time out value from the RAM 31 to produce the second time out signal when the timed period value coincides with the second time out value. The CPU controller 29 supplies the first and second time out signals to the jump pulse producing circuit 6.

The CPU controller 29 compares a level of the digital tracking error signal with the predetermined reference level to produce the comparison signal when the level of the digital tracking error signal is higher than the predetermined reference level. The CPU controller 29 supplies the comparison signal to the jump pulse producing circuit 6.

The jump pulse producing circuit 6 produces the kick pulse when the jump pulse producing circuit 6 is supplied with the jump command signal. The jump pulse producing circuit 6 holds the kick pulse regardless of the zero cross detecting signal until the jump pulse producing circuit 6 is supplied with the first time out signal when the jump pulse producing circuit 6 is not supplied with the comparison signal. The jump pulse producing circuit 6 produces the brake pulse when the jump pulse producing circuit 6 is supplied with at least one of the zero cross detecting signal and the second time out signal after the kick pulse turns to the zero point.

Figure 9:
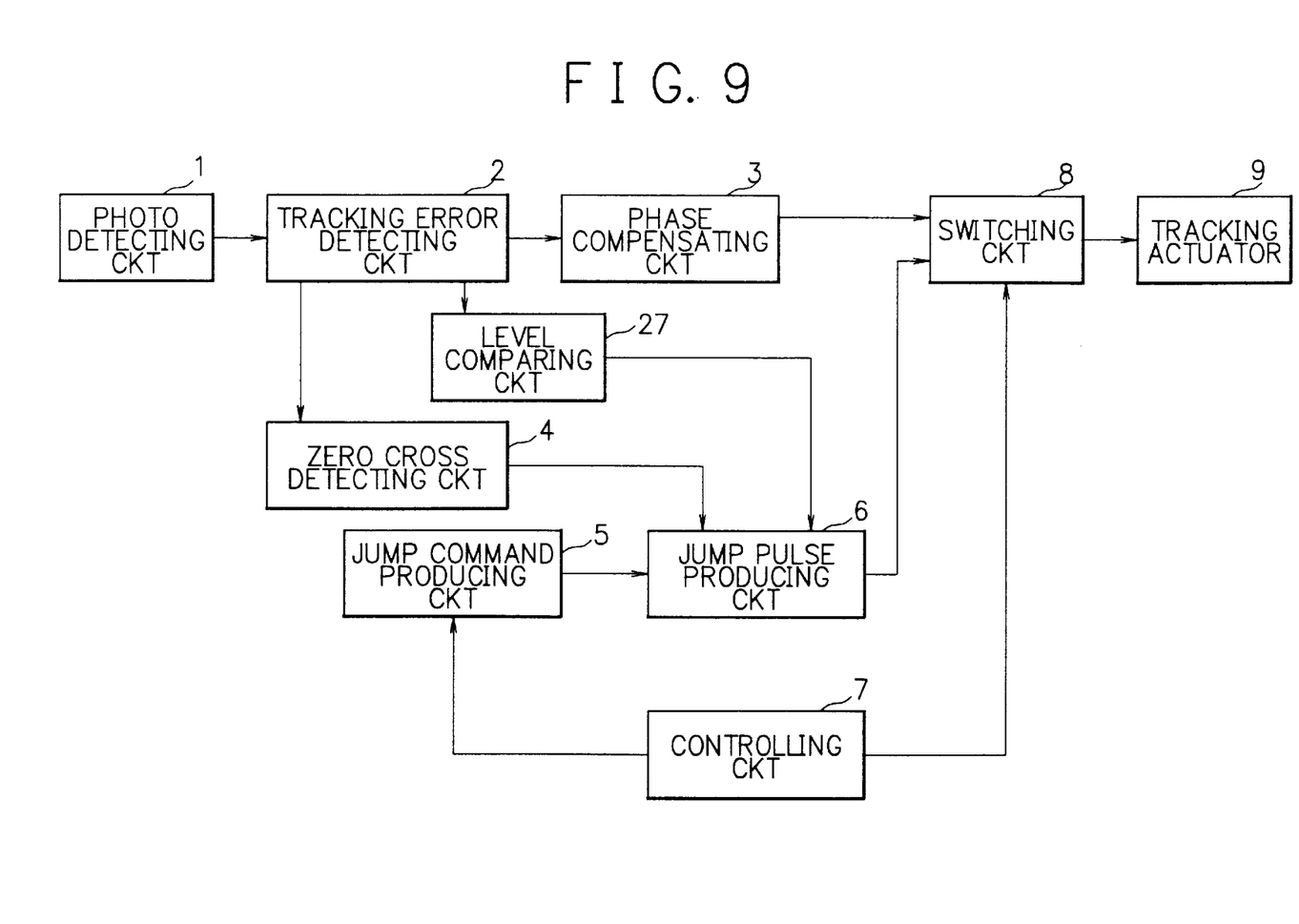
FIG. 9 is a block diagram of a track jump controlling unit according to a third embodiment of this invention.

Referring to FIG. 9, the description will proceed to a track jump controlling unit according to a third embodiment of this invention. Similar parts are designated by like reference numerals. The track jump controlling unit comprises the photo detecting circuit 1, the tracking error detecting circuit 2, the phase compensating circuit 3, the zero cross detecting circuit 4, the jump command producing circuit 5, the jump pulse producing circuit 6, the controlling circuit 7, the switching circuit 8, the tracking actuator 9, and the level comparing circuit 27.

The level comparing circuit 27 compares the level of the tracking error signal from the tracking error detecting circuit 2 with the predetermined reference level to produce the comparison signal when the level of the tracking error signal is higher than the predetermined reference level. The controlling circuit 7 produces the jump sequence start signal to supply the jump sequence start signal to the jump command producing circuit 5. The jump command producing circuit 5 produces the jump command signal when the jump command producing circuit 5 is supplied with the jump sequence start signal. The jump command producing circuit 5 supplies the jump command signal to the jump pulse producing circuit 6.

The jump pulse producing circuit 6 produces the kick pulse when the jump pulse producing circuit 6 is supplied with the jump command signal. The jump pulse producing circuit 6 holds, in the first predetermined time period, the kick pulse regardless of the zero cross detecting signal when the jump pulse producing circuit 6 is not supplied with the comparison signal. The jump pulse producing circuit 6 produces the brake pulse when the jump pulse producing circuit 6 is supplied with the zero cross detecting signal after the kick pulse turns to the zero point.

Figure 10:
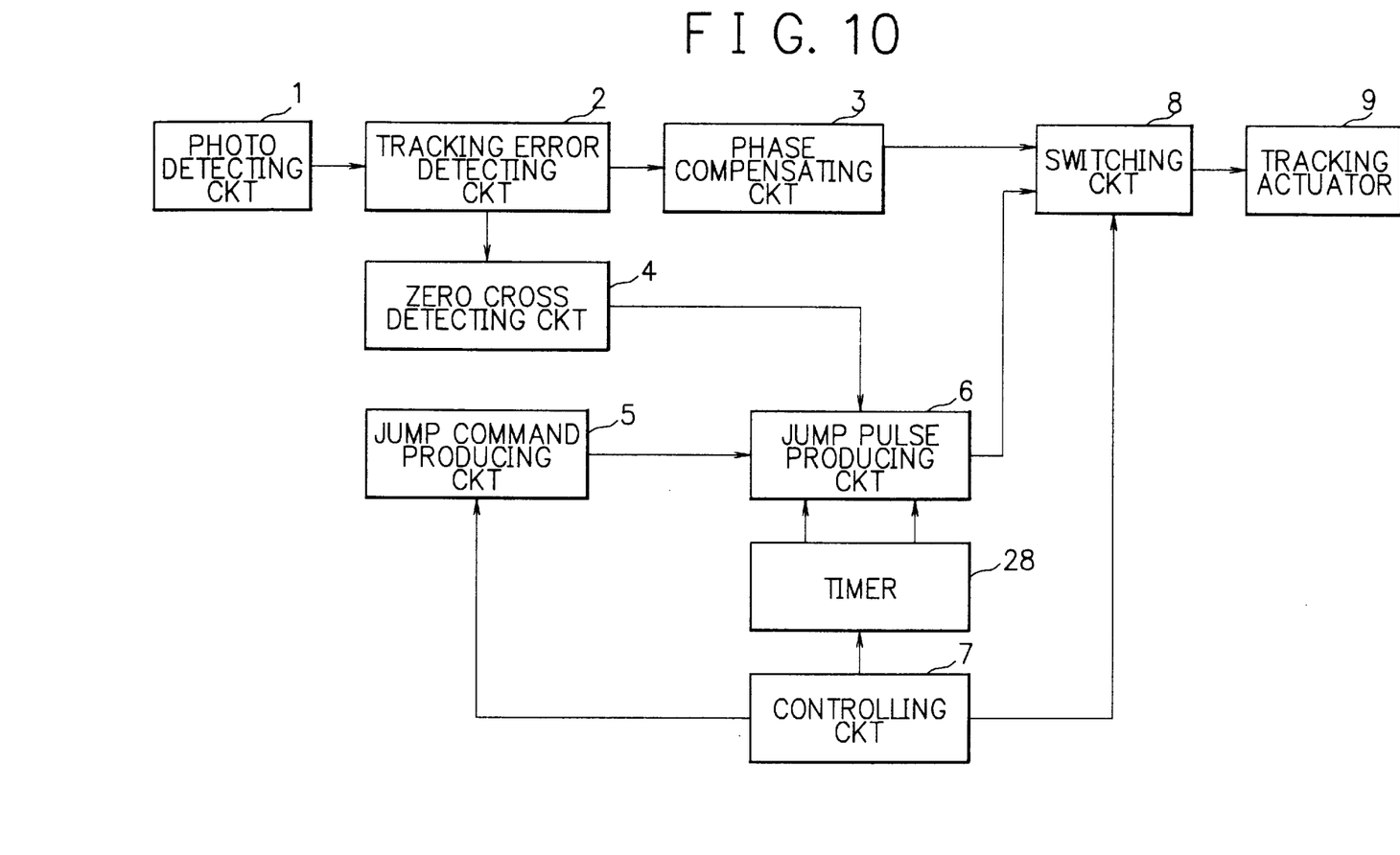
FIG. 10 is a block diagram of a track jump controlling unit according to a fourth embodiment of this invention.

Referring to FIG. 10, the description will proceed to a track jump controlling unit according to a fourth embodiment of this invention. Similar parts are designated by like reference numerals. The track jump controlling unit comprises the photo detecting circuit 1, the tracking error detecting circuit 2, the phase compensating circuit 3, the zero cross detecting circuit 4, the jump command producing circuit 5, the jump pulse producing circuit 6, the controlling circuit 7, the switching circuit 8, the tracking actuator 9, and the timer 28.

The timer 28 times the first predetermined time period from occurrence of the jump sequence start signal, namely, occurrence of the jump command signal to produce the first time out signal. Also, the timer 28 times the second predetermined time period from occurrence of the jump command signal, namely, occurrence of the jump command signal to produce the second time out signal. The second predetermined time period is greater than the first predetermined time period.

The controlling circuit 7 produces the jump sequence start signal to supply the jump sequence start signal to the jump command producing circuit 5. The jump command producing circuit 5 produces the jump command signal when the jump command producing circuit 5 is supplied with the jump sequence start signal. The jump command producing circuit 5 supplies the jump command signal to the jump pulse producing circuit 6.

The jump pulse producing circuit 6 produces the kick pulse when the jump pulse producing circuit 6 is supplied with the jump command signal. The jump pulse producing circuit 6 holds the kick pulse regardless of the zero cross detecting signal until the jump pulse producing circuit 6 is supplied with the first time out signal. The jump pulse producing circuit 6 produces the brake pulse when the jump pulse producing circuit 6 is supplied with at least one of the zero cross detecting signal and the second time out signal after the kick pulse turns to the zero point.

Thus, the track jump controlling units according to the embodiments of this invention are capable of correctly jumping the light beam spot of the photo pickup device from the one of the tracks to the other one of the tracks that is adjacent to the one of the tracks even when the photo disk has the flaw or the waste to be adhered to the photo disk. This is because the jump pulse producing circuit 6 correctly produces the kick pulse even when the photo disk has the flaw or the waste to be adhered to the photo disk.

What is claimed is:

1. A track jump controlling unit comprising:

track jumping means for jumping a light beam spot of a photo pickup device from one of tracks of a photo disk to other one of said tracks that is adjacent to the one of said tracks when said track jumping means is supplied with a jump pulse signal which has a kick pulse and a brake pulse following said kick pulse;

reflected light beam detecting means for detecting a reflected light beam from said photo disk which is supplied with a light beam from said photo pickup device to produce a light beam detecting signal;

tracking error detecting means connected to said reflected light beam detecting means for detecting a tracking error signal when said tracking error detecting means is supplied with said light beam detecting signal;

zero cross detecting means connected to said tracking error detecting means for detecting a zero cross of said tracking error signal from said tracking error detecting means to produce a zero cross detecting signal;

level comparing means connected to said tracking error signal detecting means for comparing a level of said tracking error signal with a predetermined reference level to produce a comparison signal when said level of said tracking error signal is higher than said predetermined reference level;

controlling means for producing a jump command signal; and jump pulse producing means connected to said track jumping means, to said zero cross detecting means, to said level comparing means, and to said controlling means for producing said kick pulse when said jump pulse producing means is supplied with said jump command signal, for holding, in a predetermined time period, said kick pulse regardless of said zero cross detecting signal when said jump pulse producing means is not supplied with said comparison signal, and for producing said brake pulse when said jump pulse producing means is supplied with said zero cross detecting signal after said kick pulse turns to the zero point.

2. A track jump controlling unit comprising:

track jumping means for jumping a light beam spot of a photo pickup device from one of tracks of a photo disk to other one of said tracks that is adjacent to the one of said tracks when said track jumping means is supplied with a jump pulse signal which has a kick pulse and a brake pulse following the kick pulse;

reflected light beam detecting means for detecting a reflected light beam from said photo disk which is supplied with a light beam from said photo pickup device to produce a light beam detecting signal;

tracking error detecting means connected to said reflected light beam detecting means for detecting a tracking error signal when said tracking error detecting means is supplied with said light beam detecting signal;

zero cross detecting means connected to said tracking error detecting means for detecting a zero cross of said tracking error signal from said tracking error detecting means to produce a zero cross detecting signal;

controlling means for producing a jump command signal;

timing means connected to said controlling means for timing a first predetermined time period from occurrence of said jump command signal to produce a first time out signal, and for timing a second predetermined time period from occurrence of said jump command signal to produce a second time out signal, said second predetermined time period being greater than said first predetermined time period; and jump pulse producing means connected to said track jumping means, to said zero cross detecting means, to said controlling means, and to said timing means for producing said kick pulse when said jump pulse producing means is supplied with said jump command signal, for holding said kick pulse regardless of said zero cross detecting signal until said jump pulse producing means is supplied with said first time out signal, and for producing said brake pulse when said jump pulse producing means is supplied with at least one of said zero cross detecting signal and said second time out signal after said kick pulse turns to the zero point.

3. A track jump controlling unit comprising:

track jumping means for jumping a light beam spot of a photo pickup device from one of tracks of a photo disk to other one of said tracks that is adjacent to the one of said tracks when said track jumping means is supplied with a jump pulse signal which has a kick pulse and a brake pulse following said kick pulse;

reflected light beam detecting means for detecting a reflected light beam from said photo disk which is supplied with a light beam from said photo pickup device to produce a light beam detecting signal;

tracking error signal detecting means connected to said reflected light beam detecting means for detecting a tracking error signal when said tracking error signal detecting means is supplied with said light beam detecting signal;

zero cross detecting means connected to said tracking error signal detecting means for detecting zero cross of said tracking error signal from said tracking error signal detecting means to produce a zero cross detecting signal;

level comparing means connected to said tracking error signal detecting means for comparing a level of said tracking error signal with a predetermined reference level to produce a comparison signal when said level of said tracking error signal is higher than said predetermined reference level;

controlling means for producing a jump command signal;

timing means connected to said controlling means for timing a first predetermined time period from occurrence of said jump command signal to produce a first time out signal, and for timing a second predetermined time period from occurrence of said jump command signal to produce a second time out signal, said second predetermined time period being greater than said first predetermined time period; and jump pulse producing means connected to said track jumping means, to said zero cross detecting means, to said level comparing means, to said controlling means, and to said timing means for producing said kick pulse when said jump pulse producing means is supplied with said jump command signal, for holding said kick pulse regardless of said zero cross detecting signal until said jump pulse producing means is supplied with said first time out signal when said jump pulse producing means is not supplied with said comparison signal, and for producing said brake pulse when said jump pulse producing means is supplied with at least one of said zero cross detecting signal and said second time out signal after said kick pulse turns to the zero point.

* * * * *